(12) United States Patent
Aharon et al.

(10) Patent No.: US 7,586,501 B2
(45) Date of Patent: Sep. 8, 2009

(54) SIMULTANEOUS PROJECTION OF MULTI-BRANCHED VESSELS AND THEIR CONTEXT ON A SINGLE IMAGE

(75) Inventors: Shmuel Aharon, West Windsor, NJ (US); Ozcan Oksuz, Batikent Ankara (TR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 478 days.

(21) Appl. No.: 11/430,587

(22) Filed: May 9, 2006

(65) Prior Publication Data
US 2006/0270932 A1  Nov. 30, 2006

Related U.S. Application Data (60) Provisional application No. 60/684,074, filed on May 24, 2005.

(51) Int. Cl.
  G09G 5/00    (2006.01)
  G06K 9/00    (2006.01)
  G09B 23/28   (2006.01)
  A61B 5/05    (2006.01)
  A61B 8/00    (2006.01)
(52) U.S. Cl. .................. 345/619; 382/128; 382/130; 434/267; 434/272; 600/410; 600/425; 600/443
(58) Field of Classification Search .......... 345/619; 382/128, 130–132; 600/410, 425, 443; 434/267, 434/272
See application file for complete search history.

(56) References Cited

U.S. PATENT DOCUMENTS 3,444,445 A    5/1969 Mullin (Continued)

FOREIGN PATENT DOCUMENTS

CN    1135047 A    11/1996
CN    1230271 A    9/1999

OTHER PUBLICATIONS

Etienne, Alex, et al, ""Soap-Bubble" Visualization and Quantitative Analysis of 3D Coronary Magnetic Resonance Angiograms," Magnetic Resonance in Medicine 48: 658-666, 2002.

(Continued)

Primary Examiner—Xiao M Wu
Assistant Examiner—Tize Ma
(74) Attorney, Agent, or Firm—Donald B. Paschburg (57) ABSTRACT

System and methods of displaying one or more vessels, particularly blood vessels and more particularly coronary arteries, are disclosed. Each of the one or more vessels is associated with an outline of a tube generated from a set of image data. For a viewing point, a depth image is calculated by projecting a plurality of rays from the viewing point and, for each of the plurality of rays, determining distance between the viewing point and the point of intersection of ray and any of the tubes. The surrounding area of the one or more vessels within a bounding viewing box is extracted, interpolated and rendered, and the depth image of the surrounding area is calculated. Then, an image of the one or more vessels and their background information concerning data surroundings the vessels generated based on the depth image is displayed.

22 Claims, 8 Drawing Sheets

U.S. PATENT DOCUMENTS

| | | |
|---|---|---|
| 5,611,025 A | 3/1997 | Lorensen et al. |
| 5,971,767 A | 10/1999 | Kaufman et al. |
| 2008/0094389 A1* | 4/2008 | Rouet et al. ................. 345/419 |

OTHER PUBLICATIONS

Tuchschmid, Stefan, "CoroViz: Visualization of 3D Whole-Heart Coronary Artery MRA Data," Master's Thesis: Swiss Federal Institute of Technology Zurich Switzerland, 2004.

Tuchschmid, Stefan, et al., "CoroViz: Visualization of 3D Whole-Heart Coronary Artery MRA Data," Journal of Cardiovascular Magnetic Resonance, 2005, 7: 220-221.

Weber, Oliver, et al., "Whole-Heart Steady-State Free Precession Coronary Artery Magnetic Resonance Angiography," Magnetic Resonance in Medicine 50: 1223-1228, 2003.

* cited by examiner

SIMULTANEOUS PROJECTION OF MULTI-BRANCHED VESSELS AND THEIR CONTEXT ON A SINGLE IMAGE

CROSS-REFERENCE TO RELATED APPLICATIONS

This application claims the benefit of U.S. Provisional Application No. 60/684,074, filed May 24, 2005, which is incorporated herein by reference.

BACKGROUND OF THE INVENTION

The present invention relates to methods and systems for displaying information relating to vasculature, such as blood vessels and arteries, and more particularly to the visualization of coronary arteries.

There are different known imaging techniques for the visualization to display blood vessels in an image. Known techniques are for instance Volume Rendering (VR), multi-planar reformation (MPR), Maximum Intensity Projection (MIP) and shaded surface display (SSD) and can be used to render blood vessels in medical images. Each of these techniques, however, is limited when used in connection with displaying blood vessels, and in particular, when displaying coronary arteries.

By way of example, volume rendering can show parts of coronary arteries as well as background data associated with the coronary arteries, but may involve too much processing to be useful in a clinical setting while the images thus created may involve the risk of obliterating stenoses. Additionally, this rendering technique generally masks out of the displayed image the areas surrounds the vasculature. The lack of surrounding area information can significantly reduce the effectiveness of the visualization, making it difficult to identify the exact location and orientation of the visualized vessels. For example, if only the coronary trees are visible, it can become difficult to distinguish between the left and right sides, or determine which direction is up and which is down.

MPR techniques suffer in that they cannot display multiple arteries unless the arteries are in the same plane. Thus, problems in the arteries can be missed or, in some cases, it may appear that problems are present when there are none.

Other display techniques suffer from inaccuracies in displaying the information. For example, in unfolding techniques, either the distance or the angle associated with the vessel will be inaccurate.

Of the commonly used imaging techniques, MIP is a promising method for the visualization and evaluation of coronary arteries. Whole volume MIP will result in other cavities and vascular structures to overlap the coronaries. Thus masked MIP is preferred. However, masked MIP will only display the coronaries without depth information or their adjacent anatomy.

MIP techniques of projecting images of coronary arteries are disclosed in several articles. See, for example, Etienne, Botnar, Van Muiswinkel, Boesiger, Manning and Stuber, *"Soap-Bubble" Visualization and Quantitative Analysis of 3D Coronary Magnetic Resonance Angiograms*, Magnetic Resonance in Medicine 48:658-666 (2002), which is hereby incorporated by reference. See, also, Tuchschmid, Martin, Boesiger and Weber, *CoroViz: Visualization of 3D Whole-Heart Coronary Artery MRA Data*, Journal of Cardiovasular Magnetic Resonance, 2005, 7:220-221, which is hereby incorporated by reference.

Accordingly, new and improved systems and methods for displaying blood vessels with background information, and in particular, simultaneously showing the two coronary arteries with their surrounding contexts, are needed.

SUMMARY OF THE INVENTION

The present invention provides a system and method for displaying blood vessels. In accordance with one aspect of the present invention, the system and method of the present invention displays both coronary arteries in the same display, thereby providing advantages in clinical uses that include faster displays and the need for less processing time. The arteries may be displayed with their surrounding contextual information.

In accordance witch another aspect of the present invention a method is provided of processing medical image data for smooth rendering from a defined point of view of one or more vessels with a nearby surrounding area from 3D image data, wherein the one or more vessels are separated from the nearby surrounding area as a centerline tree from the defined point of view, comprising: creating a tubular mesh around the centerline tree; creating an image by rendering the tubular mesh from the defined point of view and saving a depth information of the rendered tubular mesh; extracting a boundary between the rendered tubular mesh and the nearby surrounding area using the depth information of the rendered tubular mesh; rendering the nearby surrounding area from the defined point of view; and combining the renderings of the tubular mesh and the nearby surrounding area.

In accordance witch a further aspect of the present invention a method is provided wherein corresponding near-plane depth information of the rendered tubular mesh will be saved as a first Z-buffer with non-visible pixels set to value 1.

In accordance witch another aspect of the present invention a method is provided, wherein the radius of the tubular mesh is a user defined radius.

In accordance witch a further aspect of the present invention a method is provided wherein rendering the nearby surrounding area includes: extracting from the Z-buffer the pixels that lie on a boundary between visible and non-visible area; storing each boundary pixel's image coordinates as an element in a 2D array; adding four points to the 2D array to define a visualization frustum; creating a 2D mesh as defined by the 2D array elements; and projecting the 2D mesh to a 3D mesh by assigning to each point defining the 2D mesh its corresponding 3D coordinate.

In accordance witch another aspect of the present invention a method is provided wherein rendering the nearby surrounding area further includes interpolating points on the 3D mesh to determine pixels in the nearby surrounding area.

In accordance witch a further aspect of the present invention a method is provided wherein rendering the nearby surrounding area further includes interpolating coordinates of points on the 3D mesh and accessing the medical image data based on the coordinates to determine pixels in the nearby surrounding area.

In accordance with another aspect of the present invention a method is provided, wherein the 2D mesh is created by applying Delaunay triangulation.

In accordance witch a further aspect of the present invention a method is provided, wherein a second near-plane depth information, is created, for example as a second Z-buffer, comprising: rendering the 3D mesh; saving the corresponding near-plane depth information of the rendered mesh as a second Z-buffer with non-visible pixels set to value 1; and saving in the second Z-buffer the pixels that correspond to visible pixels in the first Z-buffer with the saved value set to the value from the first Z-buffer.

In accordance witch another aspect of the present invention a method is provided, wherein the one or more vessels are rendered with the nearby surrounding area from 3D image data comprising: creating an image by rendering the 3D image data using the second Z-buffer as the rendering rays entry points into the 3D image data; propagating the rays a specified depth distance in the 3D image data; and skipping the pixels with second Z-buffer values of one.

In accordance with a further aspect of the present invention a method is provided wherein an additional smoothing step is performed on the second Z-buffer.

In accordance with another aspect of the present invention a method is provided, wherein a far-plane Z-buffer is used for determining the rendering rays exit points from the 3D image data.

In accordance witch a further aspect of the present invention a method is provided, wherein the one or more vessels are coronary arteries.

In accordance with another aspect of the present invention, a system including a processor and software operable on the processor to perform the previously stated tasks and methods is provided.

These steps can also be performed in a system with a graphics processing unit.

DESCRIPTION OF A PREFERRED EMBODIMENT

In the following, a three-dimensional image data set, as obtained from known medical-imaging equipment, is worked upon to present to a user a visually useful image corresponding to the image data set. In particular, blood vessels with their surrounding contextual information may be displayed. The image data set may be obtained, for example, from whole heart magnetic resonance angiography (MRA). It will be appreciated that three-dimensional data sets obtained by other means may also be utilized. That is, the present invention is not limited to specific types of three-dimensional datasets, file formats, voxel or pixel resolutions, or the like. The three dimensional data set may be thought of as describing a plurality of specific locations in space, each with a corresponding intensity value.

The present invention method may be implemented in the form of a computer program executable on any suitable computing device, such as a personal computer, as known in the art. The program may be coded using any suitable programming language. In particular, graphical programming languages, such as OpenGL or DirectX, may be used to implement the present invention method. Providing a program that implements the present invention display algorithm should be routine for one of reasonable skill in the art, after having the benefit of the following disclosure.

Figure 1:
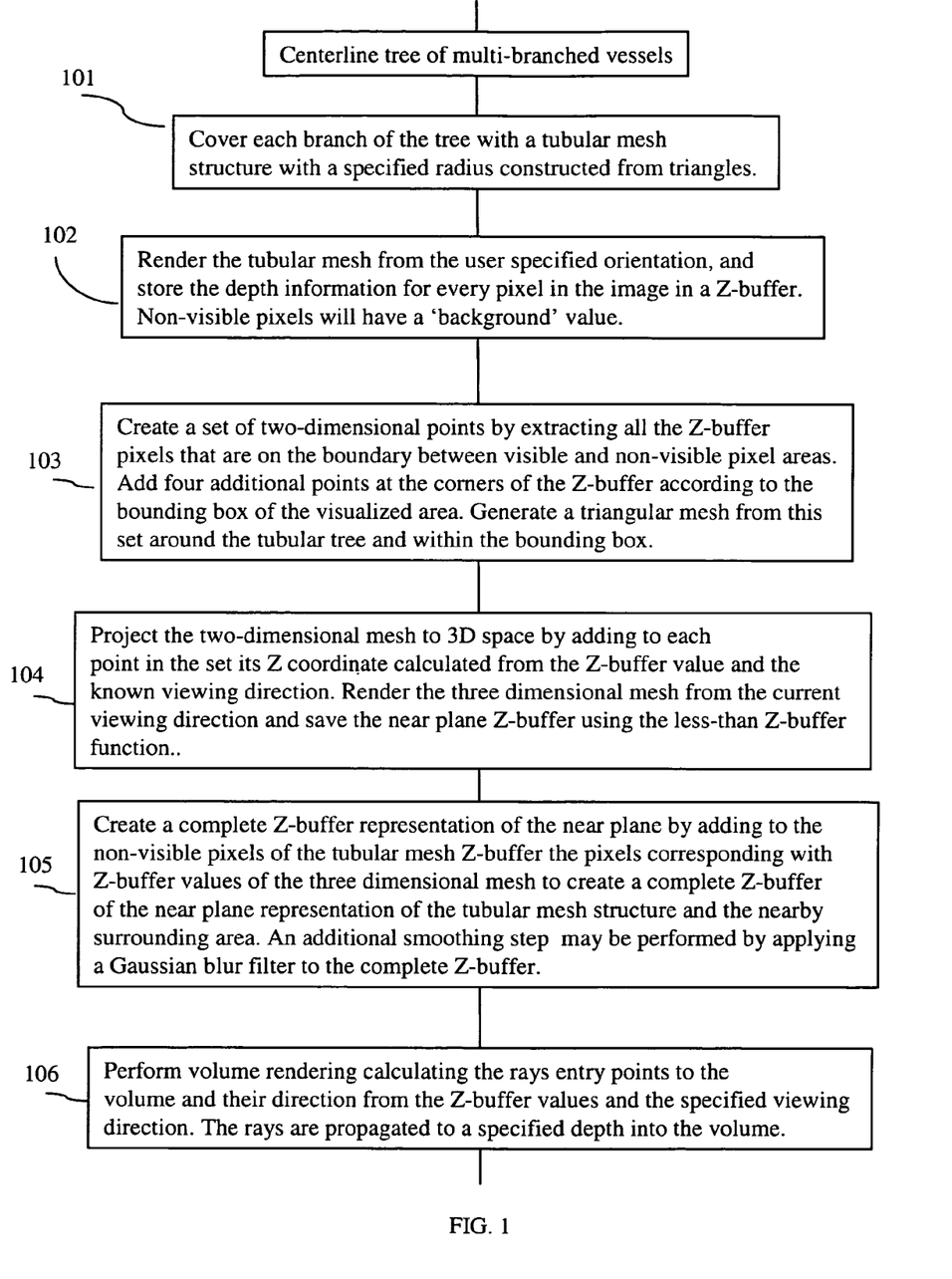
FIG. 1 is a flow diagram showing steps of the method in the present inventions.

The steps of the method that is part of the present invention are presented in one embodiment that is provided next. The steps are also shown in a flow diagram in FIG. 1.

Figure 2:
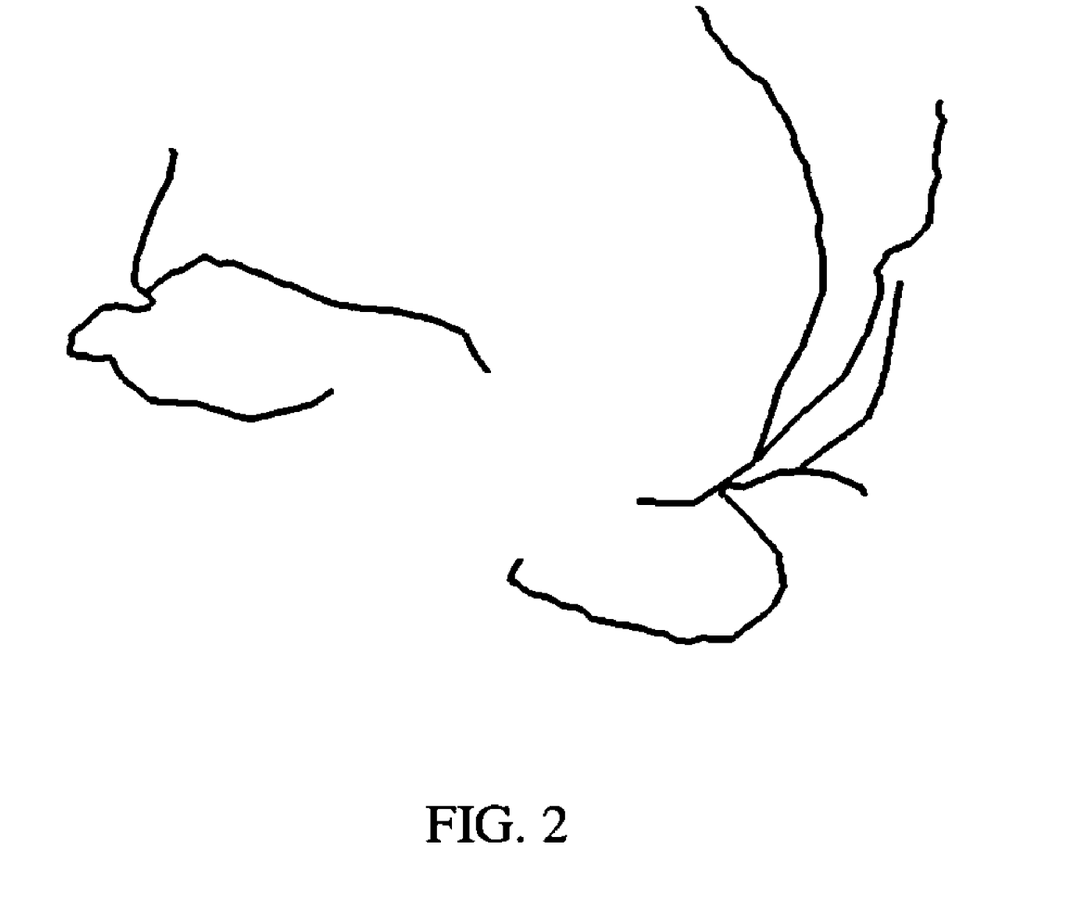
FIG. 2 shows an extracted centerline tree representing coronary arteries.
Figure 3:
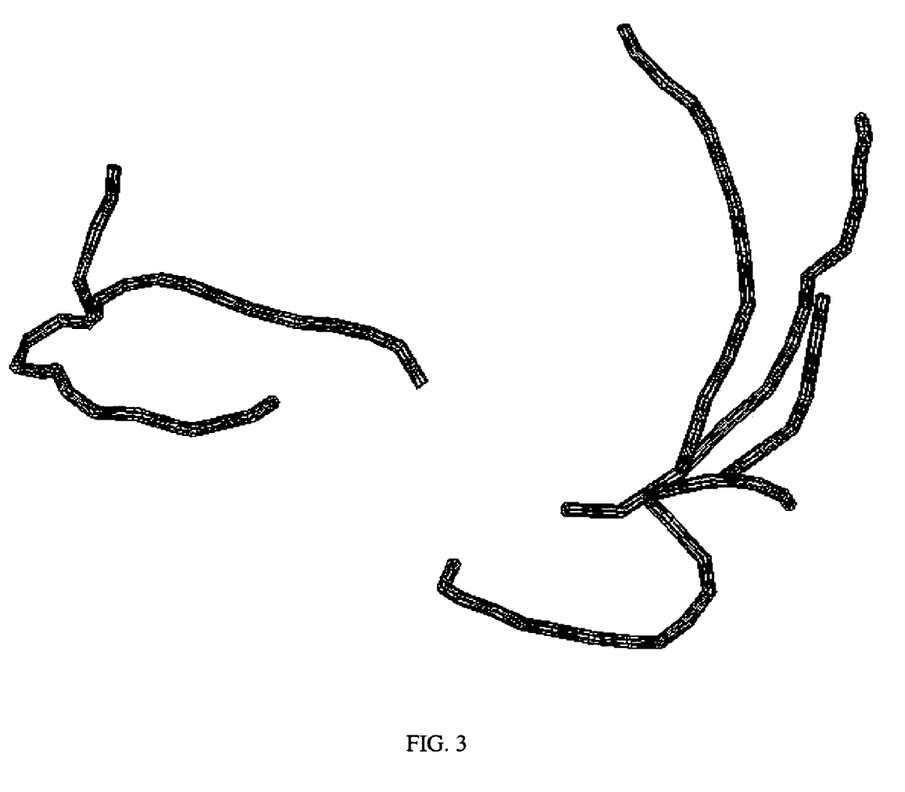
FIG. 3 shows a meshed tubular structure representing the centerline tree.

Step 1. Referring to 101 in FIG. 1, vessel centerlines specified by a semi-automatic tracking algorithm and/or manual user specification from the volume are extracted and inputted to the first step of the method. An example of such an extracted tree is shown in FIG. 2. Semi-automatic tracking algorithms are known. Several examples of known Vessel Tracking methods are provided in section 8.6 on page 36 of Stefan Tuchschmid, "CoroViz: Visualization of 3D Whole-Heart Coronary Artery MRA Data", Master's Thesis *Swiss Federal Institute of Technology, Zurich, Switzerland*, 2004 which is incorporated herein by reference. From the vessel centerlines, a set of tubes with a specified radius along each vessel centerline is created. A tubular triangular mesh, with a specified radius, to represent the multi-branched tree is created. That is, every branch of the centerline tree is covered with a tubular mesh structure constructed from triangles. An example of the tubular mesh structure is shown in FIG. 3.

Figure 4:
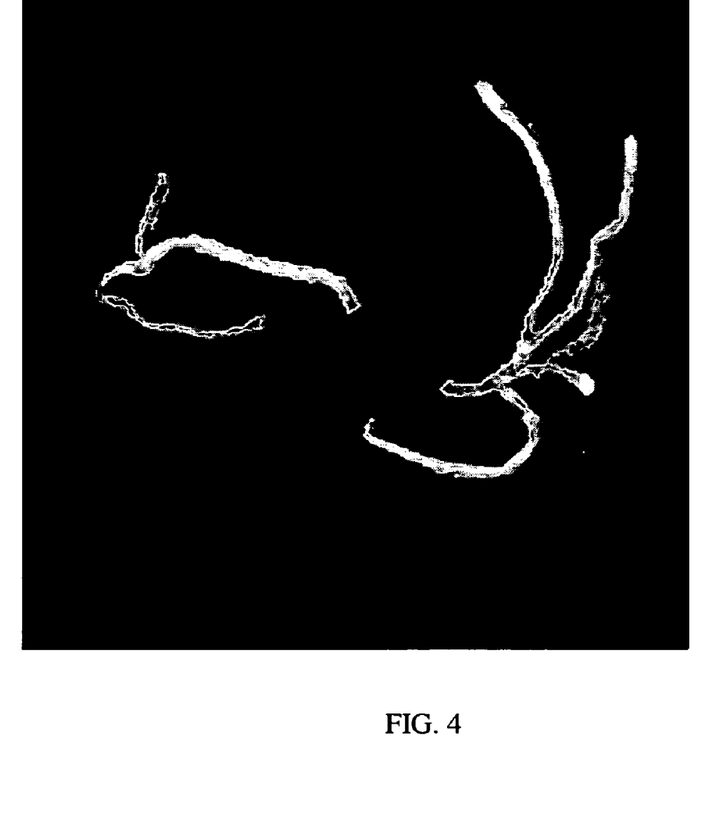
FIG. 4 shows the rendered tubular structure.
Figure 5:
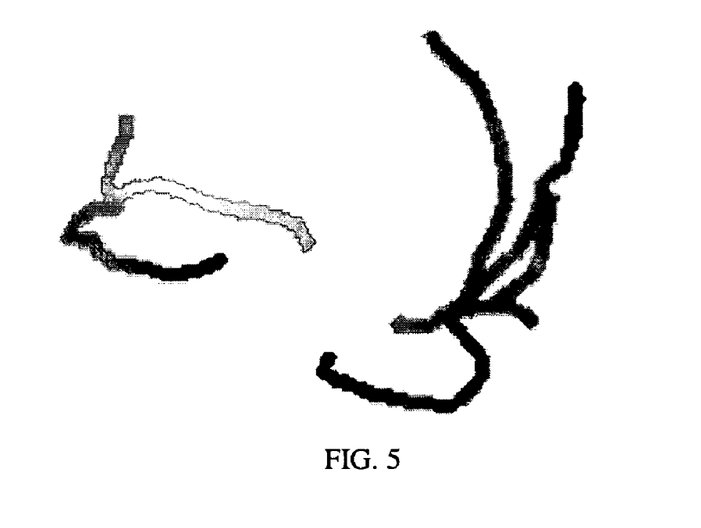
FIG. 5 shows the representation of the near-plane depth information (Z-buffer) of the tubular structure.

Step 2. Referring to 102 in FIG. 1, the generated tubular mesh is rendered applying the user specified orientation saving the near-plane depth information (Z-buffer). An example of the rendered tubular structure is shown in FIG. 4. Every visible pixel in the resulting Z-buffer specifies the distance, along the viewing direction, from the viewer to the near visible part of the tubular mesh. Pixels in areas where there is no tree to visualize, called non-visible pixels, will have the specified background value of one. This Z-buffer is saved for later use. A drawing representing the Z-buffer of the tree is shown in FIG. 5.

Figure 6:
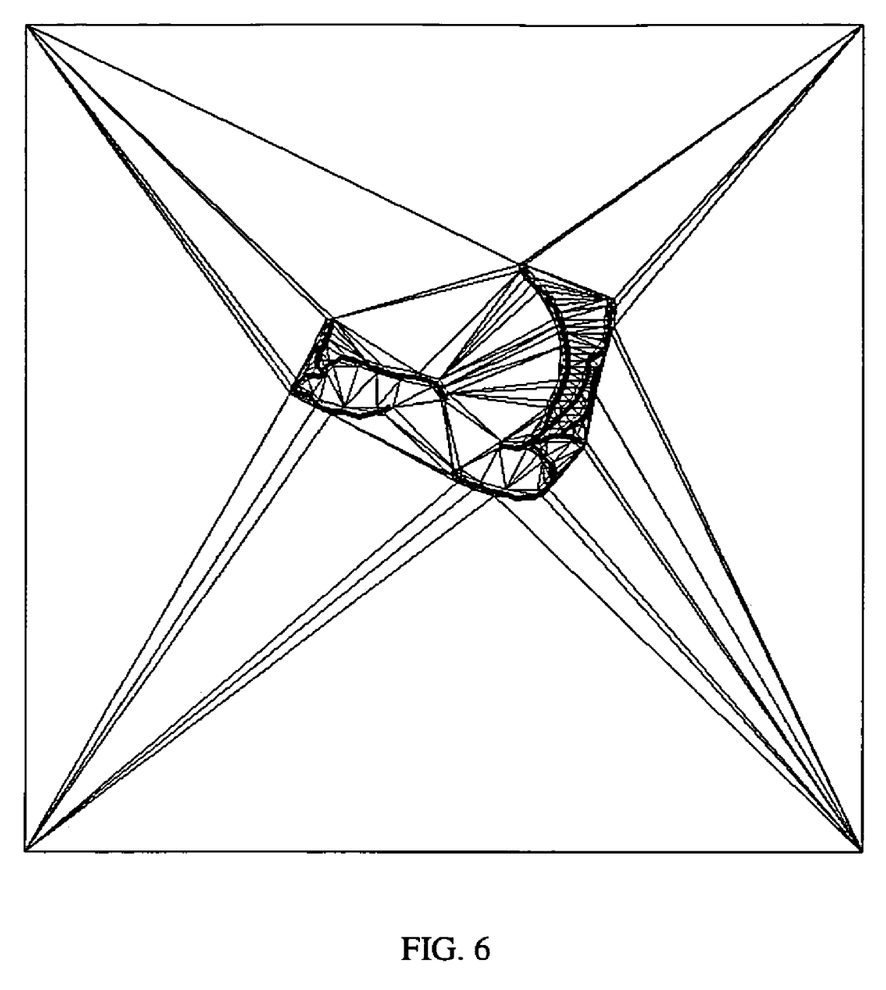
FIG. 6 shows the Delaunay triangular mesh representing the surrounding area of the coronary arteries.

Step 3. Referring to 103 in FIG. 1, a set of two-dimensional points is generated by extracting all the Z-buffer pixels that are on the boundary between visible and none-visible pixel areas. Four additional points are added at the corners of the Z-buffer according to the desired bounding box, also known as frustum, of the visualized area (or image size). A triangular mesh is generated from this set of two-dimensional points that fills the area between the border of the visualized area and the boundary between visible and non-visible pixels. This mesh can be generated using Delaunay triangulation, for example. FIG. 6 shows an example of such a triangular mesh within a bounding box.

Step 4. Referring to 104 in FIG. 1, the generated two-dimensional mesh is then projected to three-dimensional space by adding to each point its Z coordinate calculated from the corresponding Z-buffer value and the known model-view transformation of the specific viewing direction. This three dimensional triangular surface mesh is rendered from the current viewing direction and the near plane Z-buffer is saved.

Step 5. Referring to 105 in FIG. 1, a complete Z-buffer representation of the near plane is created by adding to the non-visible pixels of the tubular mesh Z-buffer that was saved earlier, the corresponding Z-buffer values from the tubular mesh rendering in the previous step. The result is a complete near plane representation of the original tubular mesh structure and their surrounding area, with smooth interpolated changes of the depth (Z-value) from the tubular mesh to the nearby surrounding area. An additional smoothing step can be performed by applying a Gaussian blur filter, for example, to the generated Z-buffer.

Figure 7:
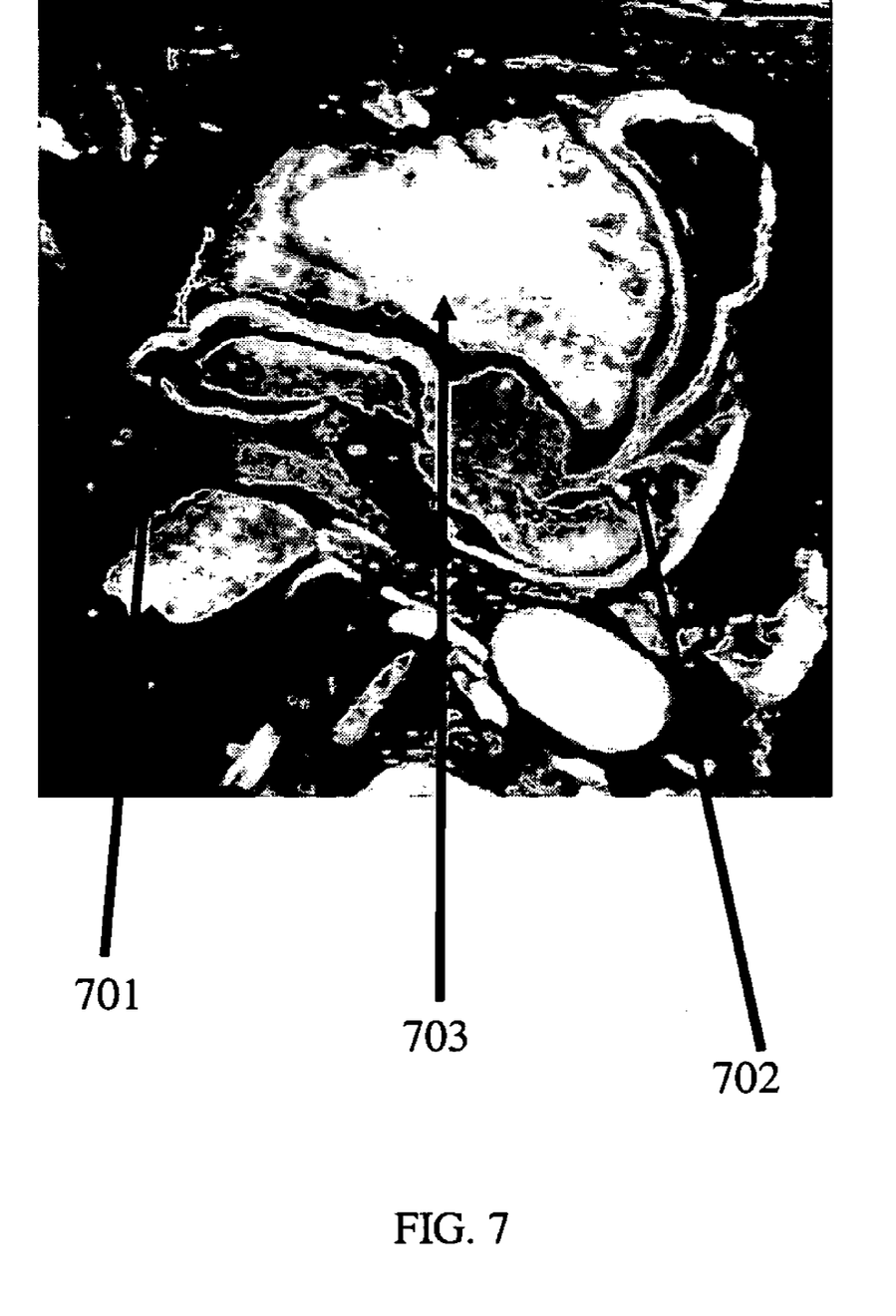
FIG. 7 shows the projected arteries (LCA and RCA) in one image within the rendered context of their surrounding area.

Step 6. Referring to 106 in FIG. 1, the final step is to perform volume rendering calculating the rays entry points to the volume and their direction from the generated Z-buffer values and the specified viewing direction. The rays are propagated to some specified depth into the volume. Alternatively, the far Z-plane can be generated in a similar way to provide the exit point for each ray. This method can be used with different types of volume rendering. Such as, Maximal Intensity Projection (MIP), volume render without shading, or shaded volume rendering. FIG. 7 shows the multi-branch vessels, derived from the previous steps, within the context of its surrounding area. The view can be interactively rotated, zoomed, panned, and windowed. In addition, the radius of the tube representing the vessels and the thickness of the visualized volume can be changed. The display of the vessels surroundings can be toggled to provide local assessments of the coronary arteries alone. If the viewing direction changes, due to user rotation of the scene, the process is repeated and a new projected image is generated. This is done at interactive rates, allowing the user to interactively manipulate the viewing direction to find the best view of the vessels.

Figure 8:
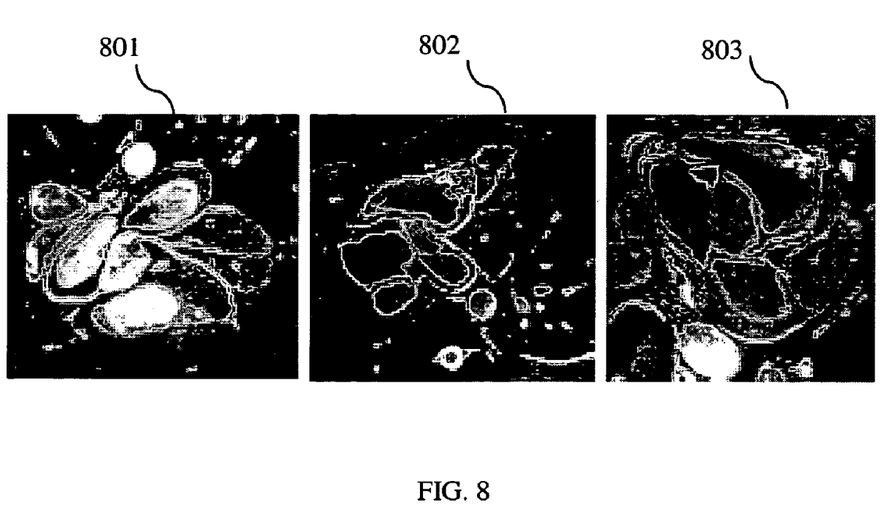
FIG. 8 shows three images created by applying the present invention.

The method here provided as an aspect of the present invention was assessed on coronary MR data from eight patients, with processing time for an inexperienced user of less than 5 minutes per data set. Simultaneous projection of the right coronary arteries (RCA) and the left coronary arteries (LCA) with their surroundings was successfully processed on all data sets. FIG. 8 with images 801, 802 and 803 depict the visualization examples from thee different patients. They show the visualization of the left and right coronary arteries from three different patients' MRA data sets. The surrounding anatomy provides additional reference for orientation and localization of the arteries. In addition, the exact 3D location of every point on the projected image is known, allowing accurate measurements of the vessel's length.

A method has been presented in the present invention that can be a tool that enables the visualization of MRA data, and provides simultaneous display of multi-branched vessels on a single image, together with their surroundings without distortion. The method is not limited only to the vessels spanning the visible part of a sphere from a given viewing direction, but provides simultaneous display of the entire RCA and LCA trees as is demonstrated in the images in FIG. 7 and FIG. 8. In FIG. 7 the RCA and LCA trees are identified as 701 and 702, respectively; and 703 is identified as part of the surrounding environment of the coronary trees.

Figure 9:
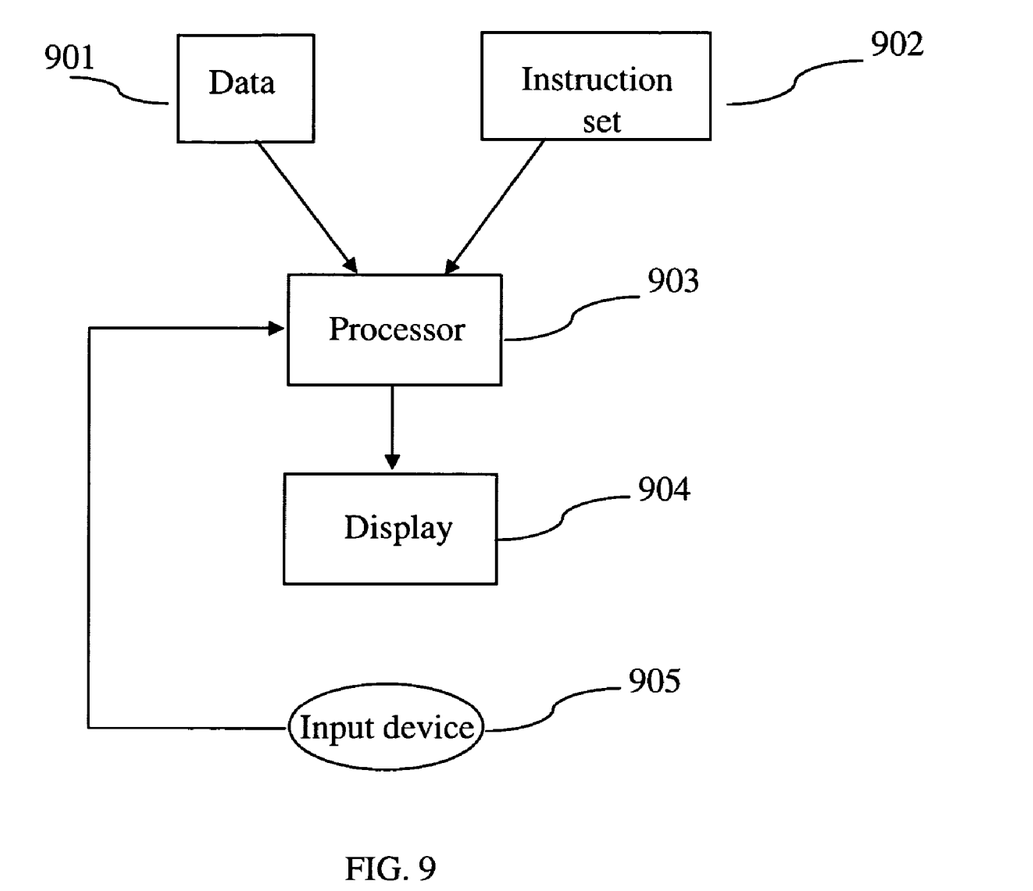
FIG. 9 shows a diagram of a system according to the present invention.

The display methods that are part of the present invention can be executed by a system as shown in FIG. 9. The system is provided with data 901 representing the to be displayed image. An instruction set or program 902 executing the methods of the present invention is provided and combined with the data in a processor 903, which can process the instructions of 902 applied to the data 901 and show the resulting image on a display 904. The instructions 902 may also comprise the instructions to extract the vessel centerline tree. The processor can be dedicated hardware, a GPU, a CPU or any other computing device that can execute the instructions of 902. An input device 905 like a mouse, or track-ball or other input device allows a user to select for instance the viewing direction and to start the displaying process. Consequently the system as shown in FIG. 9 provides an interactive system for simultaneous projection of multi-branched vessels with their surroundings in a single image.

Any reference to the term pixel herein shall also be deemed a reference to a voxel.

The following references provide background information generally related to the present invention and are hereby incorporated by reference: [1] Weber, O. M., Martin, A. J. and Higgins. "Whole-heart steady-state free precession coronary artery magnetic resonance angiography." Magnetic Resonance in Medicine, 2003; 50:1223-1228; [2] Etienne, A., Botnar, R. M., Van Muiswinkel, A. M. C., Boesiger P., Manning, W. J., and Stuber, M. ""Soap-Bubble" Visualization and Quantitative Analysis of 3D Coronary Magnetic Resonance Angiograms.", Magnetic Resonance in Medicine 48:658-666 (2002); [3] Tuchschmid S, Martin, A. J., Boesiger, P, and Weber, O. M. "CoroViz: Visualization of 3D Whole-Heart Coronary Artery MRA Data." Journal of Cardiovascular Magnetic Resonance. 2005, 7: 220-221; and [4] Stefan Tuchschmid, "CoroViz: Visualization of 3D Whole-Heart Coronary Artery MRA Data", Master's Thesis *Swiss Federal Institute of Technology*, Zurich, Switzerland, 2004.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of processing medical image data with a processor to generate an image to a display for smooth rendering from a defined point of view of one or more vessels with a nearby surrounding area from 3D image data, wherein the one or more vessels are separated from the nearby surrounding area as a centerline tree from the defined point of view, comprising:

creating a tubular mesh around the centerline tree;

creating an image by rendering the tubular mesh from the defined point of view and saving a depth information of the rendered tubular mesh, wherein corresponding near-plane depth information of the rendered tubular mesh will be saved as a first Z-buffer with non-visible pixels set to value 1;

extracting a boundary between the rendered tubular mesh and the nearby surrounding area using the depth information of the rendered tubular mesh;

rendering the nearby surrounding area from the defined point of view, including the steps of:

extracting from the Z-buffer the pixels that lie on a boundary between visible and non-visible area;

storing each boundary pixel's image coordinates as an element in a 2D array;

adding four points to the 2D array to define a visualization frustum;

creating a 2D mesh as defined by the 2D array elements; and projecting the 2D mesh to a 3D mesh by assigning to each point defining the 2D mesh its corresponding 3D coordinate;

combining the renderings of the tubular mesh and the nearby surrounding area; and the processor generating an image to the display, including a first part of the one or more vessels that in the defined point of view lies behind a second part of the one or more vessels and would be obscured by a surrounding area of the second part of the one or more vessels.

2. The method as claimed in claim 1, wherein the radius of the tubular mesh is a user defined radius.

3. The method as claimed in claim 1, wherein rendering the nearby surrounding area further includes interpolating points on the 3D mesh to determine pixels in the nearby surrounding area.

4. The method as claimed in claim 1, wherein rendering the nearby surrounding area further includes interpolating coordinates of points on the 3D mesh and accessing the medical image data based on the coordinates to determine pixels in the nearby surrounding area.

5. The method as claimed in claim 1, wherein the 2D mesh is created by applying Delaunay triangulation.

6. The method as claimed in claim 1, wherein a second near-plane depth information is created comprising:
 rendering the 3D mesh;
 saving the corresponding near-plane depth information of the rendered mesh as a second Z-buffer with non-visible pixels set to value 1; and
 saving in the second Z-buffer the pixels that correspond to visible pixels in the first Z-buffer with the saved value set to the value from the first Z-buffer.

7. The method as claimed in claim 6, wherein the one or more vessels are rendered with the nearby surrounding area from 3D image data comprising:
 creating an image by rendering the 3D image data using the second Z-buffer as the rendering rays entry points into the 3D image data;
 propagating the rays a specified depth distance in the 3D image data; and
 skipping the pixels with second Z-buffer values of one.

8. The method as claimed in claim 7, wherein an additional smoothing step is performed on the second Z-buffer.

9. The method as claimed in claim 8, wherein the additional smoothing step is a Gaussian blur filter.

10. The method as claimed in claim 1, wherein a far-plane Z-buffer is used for determining the rendering rays exit points from the 3D image data.

11. The method as claimed in claim 1, wherein the one or more vessels are coronary arteries.

12. A system of processing medical image data for smooth rendering from a defined point of view of one or more vessels with a nearby surrounding area from 3D image data, wherein the one or more vessels are separated from the nearby surrounding area as a centerline tree from the defined point of view, comprising:
 a processor;
 software operable on the processor for:
  creating a tubular mesh around the centerline tree;
  creating an image by rendering the tubular mesh from the defined point of view and saving a depth information of the rendered tubular mesh, including:
   saving corresponding near-plane depth information of the rendered tubular mesh as a first Z-buffer with non-visible pixels set to background value;
   extracting a boundary between the rendered tubular mesh and the nearby surrounding area using the depth information of the rendered tubular mesh, including:
    extracting from the Z-buffer the pixels that lie on a boundary between visible and non-visible area;
    storing each boundary pixel's image coordinates as an element in a 2D array;
    adding four points to the 2D array to define a visualization frustum;
    creating a 2D mesh as defined by the 2D array elements; and
    projecting the 2D mesh to a 3D mesh by assigning to each point defining the 2D mesh its corresponding 3D coordinate;
  rendering the nearby surrounding area from the defined point of view, including:
   interpolating coordinates of points on the 3D mesh and accessing the medical image data based on the coordinates to determine pixels in the nearby surrounding area; and
  combining the renderings of the tubular mesh and the nearby surrounding area.

13. The system as claimed in claim 12, wherein corresponding near-plane depth information of the rendered tubular mesh will be saved as a first Z-buffer with non-visible pixels set to value 1.

14. The system as claimed in claim 12, wherein the radius of the tubular mesh is a user defined radius.

15. The system as claimed in claim 12, wherein the 2D mesh is created by applying Delaunay triangulation.

16. The system as claimed in claim 12, wherein a second near-plane depth information is created comprising:
 rendering the 3D mesh;
 saving the corresponding near-plane depth information of the rendered mesh as a second Z-buffer with non-visible pixels set to value 1; and
 saving in the second Z-buffer the pixels that correspond to visible pixels in the first Z-buffer with the saved value set to the value from the first Z-buffer.

17. The system as claimed in claim 16, wherein the one or more vessels are rendered with the nearby surrounding area from 3D image data comprising:
 creating an image by rendering the 3D image data using the second Z-buffer as the rendering rays entry points into the 3D image data;
 propagating the rays a specified depth distance in the 3D image data; and
 skipping the pixels with second Z-buffer values of one.

18. The system as claimed in claim 17, wherein an additional smoothing step is performed to the second Z-buffer.

19. The system as claimed in claim 18, wherein the additional smoothing step is a Gaussian blur filter.

20. The system as claimed in claim 12, wherein a far-plane Z-buffer is used for determining the rendering rays exit points from the 3D image data.

21. The system as claimed in claim 12, wherein the one or more vessels are coronary arteries.

22. The system as claimed in claim 12, wherein the processor is a graphics processing unit.

* * * * *

UNITED STATES PATENT AND TRADEMARK OFFICE
CERTIFICATE OF CORRECTION

| | | |
|---|---|---|
| PATENT NO. | : 7,586,501 B2 | Page 1 of 1 |
| APPLICATION NO. | : 11/430587 | |
| DATED | : September 8, 2009 | |
| INVENTOR(S) | : Aharon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Fourteenth Day of September, 2010

David J. Kappos
*Director of the United States Patent and Trademark Office*